July 10, 1945.  C. H. CHAPMAN ET AL  2,380,217
CONDUIT CLOSURE
Filed Feb. 25, 1943
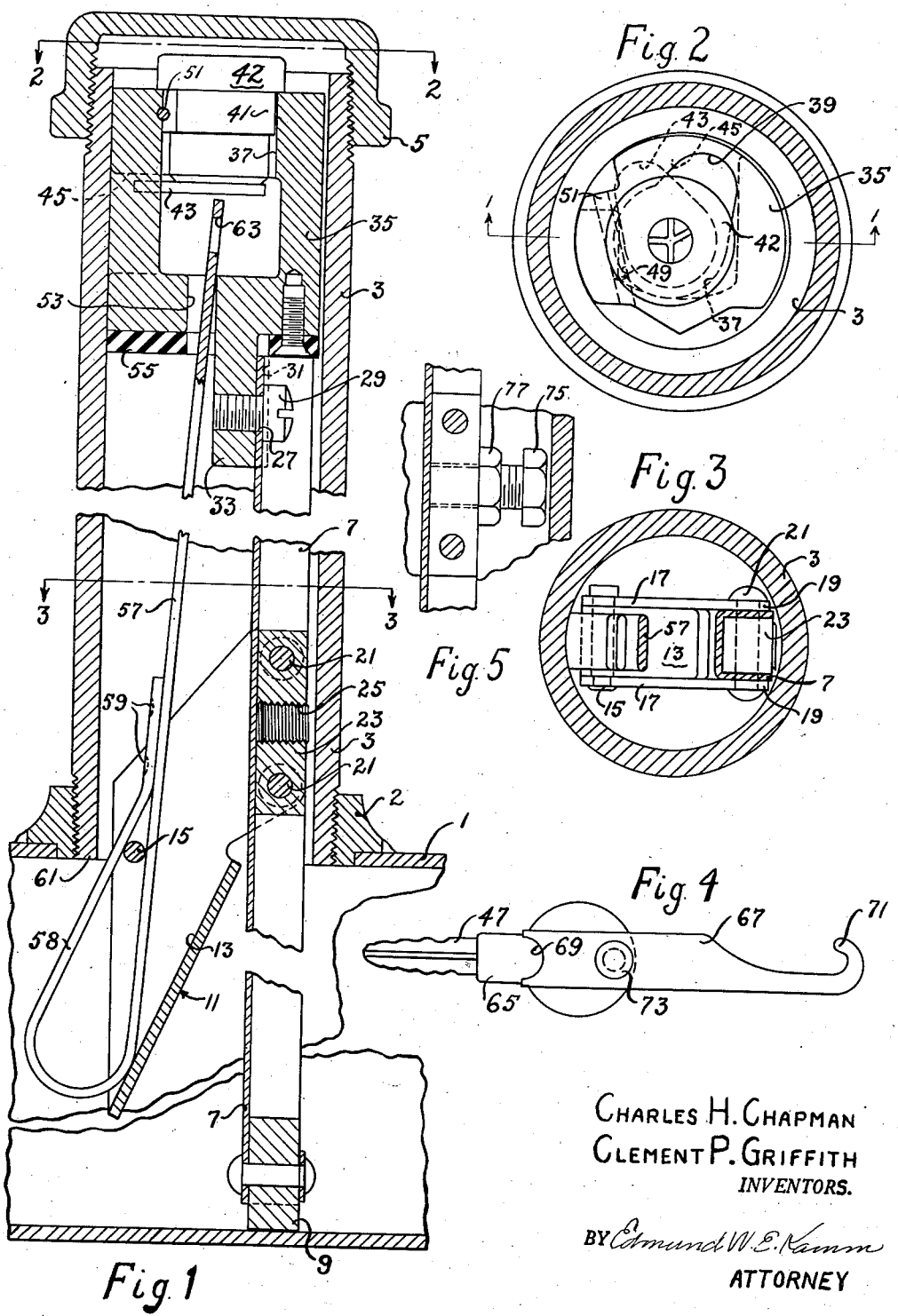
Charles H. Chapman
Clement P. Griffith
INVENTORS.
BY Edmund W. E. Kamm
ATTORNEY Patented July 10, 1945

2,380,217

UNITED STATES PATENT OFFICE 2,380,217

CONDUIT CLOSURE

Charles H. Chapman, La Grange, Ill., and Clement P. Griffith, Fort Wayne, Ind., assignors to S. F. Bowser & Company, Incorporated, Fort Wayne, Ind., a corporation of Indiana Application February 25, 1943, Serial No. 477,174

8 Claims. (Cl. 70—167)

This invention relates to a conduit closure. More specifically, it relates to a closure to prevent unauthorized access to fill pipes of tanks such as the underground gasoline tanks commonly used in automobile filling stations.

While many devices have been designed for this purpose, a great many difficulties are faced in providing a practical structure. Some of the requirements of the application are that the structure must be simple, sturdy and positive in operation. It must be easily installed in the field, and preferably without the use of metal working tools, because of the danger that sparks created in fitting the closure to an existing fill pipe might ignite explosive vapors which are in and about the pipe. The closure must be constructed to prevent withdrawal of the closure from the pipe unless it is unlocked in the intended manner, and it must also be constructed to prevent its being driven downwardly through the fill pipe into the tank.

A number of prior art devices rely upon inserts and other fastenings provided at the mouth of the fill pipe. However, because of the fire hazard during installation and because of the various fill boxes, caps and other accessories usually applied to the mouth of the fill pipe in field installations, it is often impractical to use such devices. Consequently, it is an object of the invention to provide a fill pipe closure which may be readily installed in the field, without hazard, in any fill pipe which is of a diameter adapted to receive the closure.

Another object of the invention is to provide a positively locked mechanism which cannot be withdrawn upwardly through the pipe unless it is unlocked.

Another object of the invention is to provide a closure which cannot be driven downwardly through the fill pipe and into the tank to provide unauthorized access to the tank.

Another object of the invention is to provide a device which is readily adapted to various diameters of fill pipes.

Yet another object of the invention is to provide a closure which may be manufactured as a standard product and which may be modified in the field to meet the requirements of any particular installation.

Another object of the invention is to provide a fill pipe closure which will minimize danger of explosions due to sparks resulting from the replacement of the closure in the fill pipe.

These and other objects will become apparent from a study of the specification and the drawing which is attached thereto and made a part thereof, and in which:

Figure 1 is a vertical section through the fill pipe and tank showing the closure in place.

Figure 2 is a sectional plan view taken on the line 2—2 of Figure 1.

Figure 3 is a sectional view taken on the line 3—3 of Figure 1.

Figure 4 is an elevation showing the key and releasing hook used to unlock and remove the closure from the conduit.

Figure 5 is a view showing the stud used for applying the closure to pipes of larger diameter than that shown in Figure 1.

Referring now to Figure 1, the numeral 1 represents an underground tank having an inlet boss 2 and a fill pipe 3 connected thereto. A screw cap 5 is normally used to close the upper end of the fill pipe so as to prevent surface water or rain from entering the tank.

A support or channel 7 extends substantially from the bottom of the tank to near the top of the fill pipe. Mounted in the lower end of the channel is a block of wood or similar material 9 which actually engages the bottom of the tank so as to prevent the channel 7 from striking the bottom of the tank and puncturing it in the event the closure is dropped carelessly into the fill pipe. The channel may be marked at suitable intervals to indicate the depth of liquid in the tank and may thus serve as a gauge stick.

A wedge member 11 which is U-shaped in vertical cross-section has a downwardly and outwardly inclined surface 13. A pin 15 extends across the wedge member above the surface 13 and is supported at its ends in the side members 17—17 of the wedge member. The side members are extended laterally to form ears 19—19 which are adapted to embrace the channel and which are held in place thereon by rivets 21. A spacer 23 is inserted in the groove of the channel in the region of the ears and is also held in place by the rivets. This spacer is provided with an internally threaded opening 25 for a purpose which will be later described.

The upper end of the channel is perforated at 27 to receive a screw 29 which holds the channel in a groove 31 which is formed in a downwardly extending projection 33 of a body member 35.

The body member 35 is preferably a casting and is provided with an eccentric bore 37 which has a lateral extension 39. The bore is adapted to receive the barrel 41 of a lock 42 and the extension 39 is formed to permit the passage of the locking member 43 of the lock 42. The body member is cored out to form a downwardly facing shoulder 45 which is adapted to be engaged by the locking member 43 to prevent withdrawal of the lock from bore 37 when the locking member has been swung by means of the key 47 into position underneath the shoulder. The barrel 41 of the lock is provided with a flat surface 49 which is adapted to engage a pin 51 which is set in the body 35 to prevent rotation of the lock barrel 41 in the bore 37.

The lower portion of the body 35 is provided with an opening 53 and the lower surface of the body 35 is provided with a plate 55 which may be of brass, copper or plastic material, or any other material which will not produce a spark, should it come into violent contact with the upper edge of the fill pipe 3 if the closure should be dropped carelessly into the fill pipe. Fluid such as gasoline which may have been withdrawn from the tank, for instance by sealers of weights and measures, may be returned through the fill pipe without removal of the closure because the openings in the closure will permit the passage of a relatively small stream of liquid. In the construction shown in Figure 1, a funnel equipped with a pipe coupling may be screwed onto the upper end of the fill pipe to facilitate the return of the fuel to the tank.

A locking rod 57 extends upwardly through the opening 53 in the body 35 and is provided with an elongated, wedge-shaped loop or locking member 58 at its lower end. This loop is offset in a direction away from the channel 7 so that the upper portion of the locking rod and the side of the loop adjacent the channel will be in substantial alignment.

The loop is spotwelded at 59 so that it will hold its shape. The pin 15 described above is disposed in the loop and serves to limit the downward motion of the locking rod 57. The lower end of the loop is adapted to ride upon the inclined surface 13 and to be thrown thereby away from the channel 7 so that the part of the loop remote from the channel will underlie the lower end 61 of the fill pipe 3. The upper end of the locking rod is provided with an opening 63 for a purpose to be described.

Referring now to Figure 4, the key 47 is provided with a round shank 65 and a retracting bar 67 is provided at one end with a notch 69 adapted to receive the round shank 65 of the key. The other end of the retracting bar is provided with a hook 71 and the retracting bar is riveted to the key by a rivet 73.

*Modification*

Figure 1 depicts the smallest fill pipe in which the closure mechanism may be inserted without reducing the size of the components of the closure. In gasoline fill pipes, the pipe is seldom less than a two-inch pipe. However, if it is desired to apply the mechanism to a larger pipe it is necessary to supply a different sized body member 35 and to insert in the threaded hole 25 a stud 75 which is cut to the proper length for the size pipe encountered and to provide a lock nut 77 for holding the stud in the adjusted position as shown in Figure 5. In making a field installation, it is necessary to select the proper body member 35 to measure the depth of the tank and fill pipe to the point where it is desired to locate the body member and to cut off the channel 7 at the upper end, drill it and fasten it to the projection 33 on the body member. It will also be necessary to cut off the locking rod at the upper end and drill the hole 63 therein. In some cases where the tank diameter varies, it may also be necessary to position the wedge member 13 and fasten it to the channel, in the field.

*Operation*

The mechanism is shown in the locked condition in Figure 1. In order to withdraw the closure, it is necessary first to remove the cap 5 and next to insert key 47 in the lock and rotate the locking member 43 into alignment with the opening 39 so that the lock may be withdrawn from the body member 35. The key will then be removed from the lock and the hooked end 71 will then be engaged in the opening 63 and the locking rod will be drawn upwardly. As this occurs, the looped end of the locking rod will be allowed to move toward the channel member 7 as it moves up the incline 13 and the loop will thus be withdrawn from underneath the lower edge of the fill pipe.

When the lower end of the loop engages the pin 15, the entire closure assembly will be lifted and withdrawn from the fill pipe. As soon as the channel 7 is pulled out of the pipe far enough to enable the operator to grasp it, he will remove the remainder of the mechanism in the same manner as the gauge stick is ordinarily removed from the tank. Inspection of the channel member 7 will show the amount of gasoline or other liquid in the tank.

In replacing the closure, it is merely necessary to lower the assembly into the tank, depress the locking rod 57 and reinsert the lock.

As the locking rod is depressed, the inclined surface 13 will force the loop 58 away from the channel so that the horizontal distance from the outside surface of the loop to the edge of the channel remote from the loop will be greater than the diameter of the fill pipe so that the assembly cannot be withdrawn so long as the lock is in place in the body member 35.

In the case of a fill pipe which is larger than the minimum sized pipe in which the closure may be used, the horizontal distance between the outside of the loop 58 and the outer end of the stud 75 will be greater than the internal diameter of the fill pipe when the locking rod is in its lowermost position so that the closure cannot be moved so long as the lock is in place.

The body member substantially closes the upper end of the fill pipe so as to prevent any hose or other means for removing liquid from the tank from being inserted in the fill pipe and the lock 42, when it is in place, is immediately adjacent the upper end of the locking rod so that the rod must be fully depressed before the lock can be inserted.

It is obvious that various changes may be made in the form, structure and arrangement of parts without departing from the spirit of the invention. Accordingly, we do not desire to be limited to the specific embodiment disclosed herein primarily for purposes of illustration; but instead, we desire protection falling fairly within the scope of the appended claims.

What we claim to be new and desire to protect by Letters Patent of the United States is:

1. In a closure for a tank which is equipped with a fill pipe, the combination of a support adapted to rest on the bottom of the tank, a fill pipe closure on said support, means on said support adapted to engage the interior of the fill pipe, a locking member mounted on said support for translatory movement longitudinally and laterally relative to the support, and means on said support adapted to force said locking member laterally into locking position under said fill pipe upon longitudinal movement of said locking member, to prevent removal of the support from the tank, said first named means being so disposed as to engage the fill pipe at a point substantially diametrically opposite to the point of contact of said fill pipe and said locking member.

2. In a closure for a tank which is equipped with a fill pipe, the combination of a support adapted to rest on the bottom of the tank, a fill pipe closure on said support, means on said support adapted to engage the interior of the fill pipe, a locking member mounted on said support for translatory movement longitudinally and laterally relative to the support, means on said support adapted to force said locking member into locking position under said fill pipe, upon longitudinal movement of said locking member in one direction, to prevent removal of the support, and means including a key actuated lock for preventing access to said locking member when it occupies said locking position.

3. In a closure for a tank which is equipped with a fill pipe, the combination of a support adapted to rest on the bottom of the tank, said support being adapted to engage the interior of the fill pipe, a locking member mounted on said support for locking or unlocking movement relative to and substantially parallel with the support, means on said support adapted to force said locking member into locking position under said fill pipe, upon locking movement of said member, to prevent removal of the support, means including a key actuated lock for holding said locking member in said locking position, said locking member extending to a point near the upper end of the fill pipe, and means on the upper end of said member adapted to receive a tool for transmitting unlocking movement to said member.

4. In a closure for a tank which is equipped with a fill pipe, the combination of a body adapted to fit in said fill pipe, a support fixed to the body, adapted to rest on the tank bottom and to support the body in a predetermined position in the fill pipe, locking means mounted on said support for translatory movement both longitudinally and laterally with respect thereto and between locking and released position, means on said support adapted to force said locking means underneath the fill pipe into the locking position upon longitudinal movement of said locking means, so as to prevent withdrawal of said body and support from the fill pipe, and a positioning stud mounted on said support and adapted to engage the interior of the fill pipe.

5. In a closure for a tank which is equipped with a fill pipe, the combination of a body adapted to fit in said fill pipe, a support fixed to the body, adapted to rest on the tank bottom and to support the body in a predetermined position in the fill pipe, locking means mounted on said support for translatory movement both longitudinally and laterally with respect thereto and between locking and released position, means on said support adapted to force said locking means underneath the fill pipe into the locking position upon longitudinal movement of said locking means so as to prevent withdrawal of said body and support from the fill pipe, and a recess in the body adapted to receive a lock and through which the locking means can be reached when the lock is removed.

6. In a closure for a tank which is equipped with a fill pipe, the combination of a body adapted to wholly enter and substantially close the pipe, a recess formed in said body to receive a lock, an opening through the lower portion of said body communicating with said recess, a support fixed to said body and adapted to rest on the bottom of the tank, a wedge member attached to the support adjacent the lower end of the fill pipe, and including an inclined surface, a locking rod having a looped end mounted on said wedge member and riding on said surface, and a pin engaged in the loop to hold the locking rod in place on the wedge member, the upper end of said locking rod being arranged in said opening and terminating in said recess below said lock.

7. In a closure for a tank which is equipped with a fill pipe, the combination of a body adapted to wholly enter and substantially close the pipe, a recess formed in said body to receive a lock, a support fixed to said body and adapted to rest on the bottom of the tank, a wedge member attached to the support adjacent the lower end of the fill pipe, and including an inclined surface, a locking rod mounted on said wedge member, riding on said surface and movable between locked and released positions, and a pin to hold the locking rod in place on the wedge member, the upper end of said locking rod terminating in said recess below said lock and so closely adjacent thereto that the lock cannot be inserted in the body unless the locking rod is in locked position.

8. In a closure for a tank which is equipped with a fill pipe, the combination of a support adapted to rest on the bottom of the tank, a fill pipe closure on said support, said support being adapted to engage the interior of the fill pipe, a locking member mounted on said support for translatory movement longitudinally and laterally relative to the support, and means on said support adapted to force said locking member laterally into locking position under said fill pipe upon longitudinal movement of said locking member, to prevent removal of the support from the tank.

CHARLES H. CHAPMAN.
CLEMENT P. GRIFFITH.